United States Patent
Lei et al.

(10) Patent No.: US 11,743,806 B2
(45) Date of Patent: Aug. 29, 2023

(54) METHOD AND APPARATUS FOR WIRELESS COMMUNICATION SUPPRESSION

(71) Applicant: FORD GLOBAL TECHNOLOGIES, LLC, Dearborn, MI (US)

(72) Inventors: Oliver Lei, Windsor (CA); Allen R. Murray, Lake Orion, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 657 days.

(21) Appl. No.: 15/832,373

(22) Filed: Dec. 5, 2017

(65) Prior Publication Data
US 2019/0174396 A1 Jun. 6, 2019

(51) Int. Cl.
*H04W 48/10* (2009.01)
*H04W 84/18* (2009.01)
*H04W 4/70* (2018.01)
*H04W 4/40* (2018.01)
H04W 28/02 (2009.01)
H04W 4/06 (2009.01)
H04W 4/80 (2018.01)
H04W 4/46 (2018.01)
H04W 4/90 (2018.01)

(52) U.S. Cl.
CPC .......... *H04W 48/10* (2013.01); *H04W 4/40* (2018.02); *H04W 4/70* (2018.02); *H04W 84/18* (2013.01); *H04W 4/06* (2013.01); *H04W 4/46* (2018.02); *H04W 4/80* (2018.02); *H04W 4/90* (2018.02); *H04W 28/0289* (2013.01)

(58) Field of Classification Search
CPC . H04W 28/0289; H04W 84/12; H04W 28/06; H04W 48/06; H04L 47/12
See application file for complete search history.

(56) References Cited

U.S. PATENT DOCUMENTS

| | | | |
|---|---|---|---|
| 8,253,589 B2 | 8/2012 | Grimm et al. | |
| 9,421,909 B2 | 8/2016 | Strickland et al. | |
| 9,505,412 B2* | 11/2016 | Bai | B60Q 9/008 |
| 2002/0193940 A1* | 12/2002 | Hashida | G01C 21/28 |
| | | | 701/468 |
| 2006/0236970 A1* | 10/2006 | Inada | F02N 11/0825 |
| | | | 307/10.3 |
| 2006/0255908 A1* | 11/2006 | Gilbert | B60R 25/24 |
| | | | 340/5.61 |
| 2007/0032225 A1* | 2/2007 | Konicek | F24F 11/62 |
| | | | 455/417 |
| 2007/0083297 A1* | 4/2007 | Tengler | H04L 67/12 |
| | | | 701/1 |

(Continued)

FOREIGN PATENT DOCUMENTS

| | | |
|---|---|---|
| GB | 2540358 A | 1/2017 |
| WO | 2016108555 A1 | 7/2016 |
| WO | 2017033486 A1 | 3/2017 |

*Primary Examiner* — Atique Ahmed
(74) *Attorney, Agent, or Firm* — Joseph Zane; Brooks Kushman P.C.

(57) ABSTRACT

A system comprises a processor configured to detect wireless device communication originating from a mobile device. The processor is also configured to determine that the mobile device is within a vehicle interior. The processor is further configured to instruct the mobile device to suppress communication designed to communicate device information to vehicles.

3 Claims, 3 Drawing Sheets

(56) References Cited

U.S. PATENT DOCUMENTS

| | | | |
|---|---|---|---|
| 2009/0296680 A1* | 12/2009 | Suzuki | H04W 72/20 370/310 |
| 2012/0023538 A1* | 1/2012 | Hattori | H04H 20/22 725/110 |
| 2012/0172012 A1* | 7/2012 | Sumcad | H04W 4/12 455/414.1 |
| 2012/0258702 A1* | 10/2012 | Matsuyama | H04L 67/12 455/420 |
| 2013/0210460 A1* | 8/2013 | Subramanian | B61L 25/025 455/456.3 |
| 2014/0058632 A1* | 2/2014 | Jungman | B60K 28/063 701/48 |
| 2015/0091740 A1* | 4/2015 | Bai | B60Q 9/008 340/901 |
| 2015/0360564 A1* | 12/2015 | Kalbus | H04W 4/48 701/36 |
| 2017/0279904 A1* | 9/2017 | Takemura | H04L 67/303 |
| 2018/0255563 A1* | 9/2018 | Chen | H04W 4/70 |
| 2019/0028955 A1* | 1/2019 | Ochiai | H04W 4/44 |
| 2019/0273817 A1* | 9/2019 | Ueno | G08G 1/005 |

\* cited by examiner

METHOD AND APPARATUS FOR WIRELESS COMMUNICATION SUPPRESSION

TECHNICAL FIELD

The illustrative embodiments generally relate to methods and apparatuses for wireless communication suppression.

BACKGROUND

Device to device communication integration, that is, the Internet of Things, is becoming ever more prevalent. In addition to all the various wireless signals passed between access points and the wireless devices most commonly used (phones, tablets, laptops), there is an ever increasing amount of additional wireless traffic from intra-device communication.

As vehicles become more integrated as "thinking" devices, the amount of vehicle to vehicle (V2V), vehicle to pedestrian (V2P) and vehicle to infrastructure (V2I) wireless traffic will only increase, which may result in RF signal traffic and congestion. At the same time, it is unreasonable to expect that people will manually disengage certain wireless-traffic-creating features on their devices, at the times when those features are unnecessary.

SUMMARY

In a first illustrative embodiment, a system comprises a processor configured to detect wireless device communication originating from a mobile device. The processor is also configured to determine that the mobile device is within a vehicle interior and instruct the mobile device to suppress communication designed to communicate device information to vehicles.

In a second illustrative embodiment, a system includes a mobile device processor configured to communicate device information to vehicles, at least under predefined conditions. The processor is also configured to receive an instruction from a vehicle to suppress communication of device information to vehicles. The processor is further configured to suppress communication of device information to vehicles until a resumption constraint is satisfied, responsive to the instruction.

In a third illustrative embodiment, a computer-implemented method, executed by a vehicle computer, includes detecting a mobile device within a vehicle interior, communicating a signal designed to provide mobile device information to a plurality of vehicles and instructing the mobile device to suppress the signal, responsive to detecting the mobile device within the vehicle interior.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
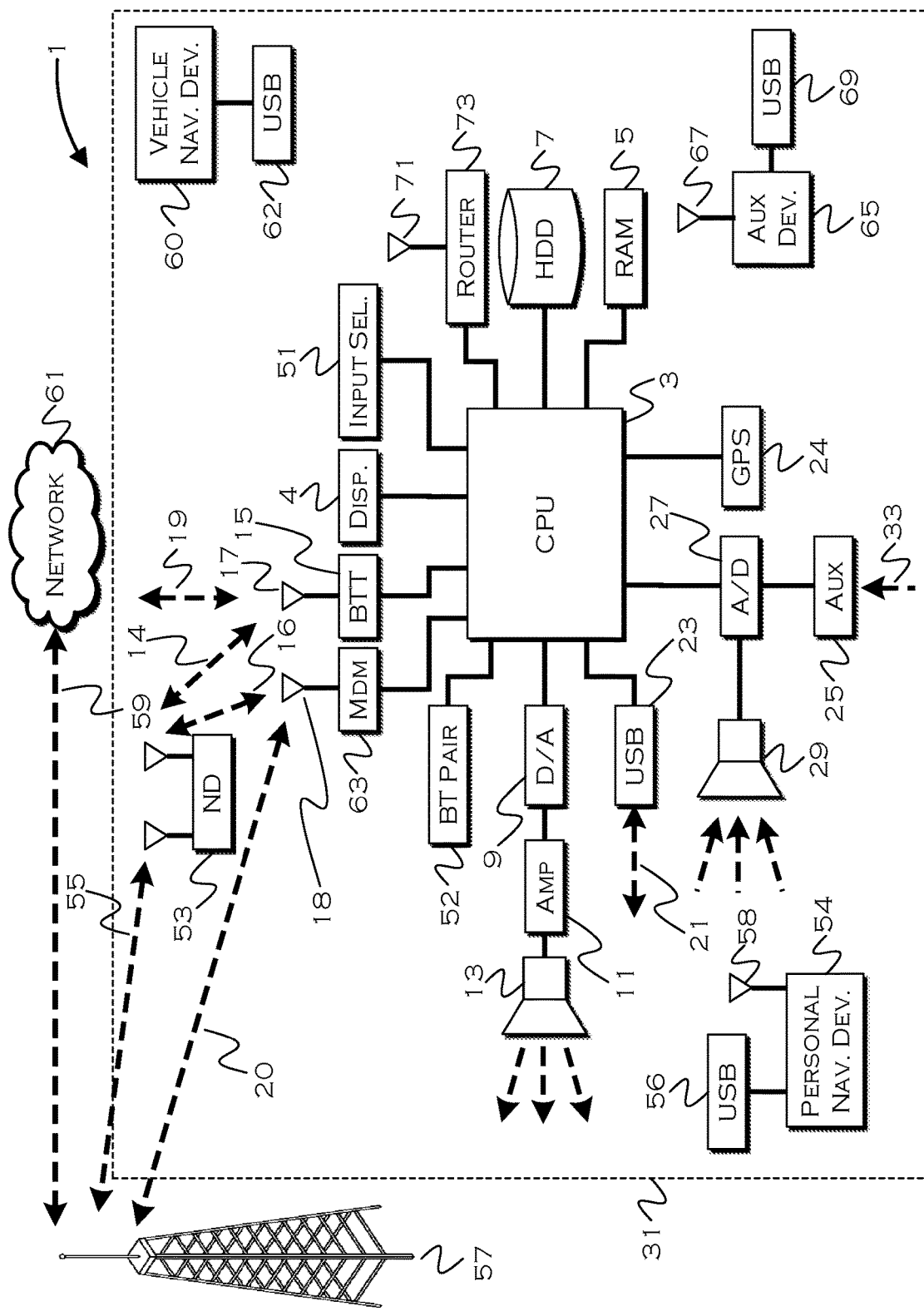
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 802.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

With the advent of dedicated short range communication (DSRC), vehicles may soon be equipped to wirelessly communication with other vehicle, infrastructure and pedestrians. This communication will help improve vehicular travel and pave the way for the adoption of autonomous or semi-autonomous vehicle control. But, with millions of vehicles traveling on the road at any given time, this new communication can result in a significant uptick in radio frequency traffic and possible congestion. Accordingly, the illustrative embodiments propose at least some methodologies and apparatuses capable of managing RF traffic, without having to rely on users to manually disengage RF transceivers, or otherwise limit transmission, in those instances where transmission is unnecessary.

For example, when a person is a passenger in a vehicle, that person does not need to communicate with moving vehicles as a pedestrian, because that person is not, in fact, a pedestrian at that time. The vehicle using V2X (vehicle to everything) communication will suffice as a communication entity on that person's behalf, at least until that person leaves the vehicle. The illustrative embodiments facilitate automatic suppression of V2P communication from user devices inside a vehicle to external vehicles, in order to help reduce RF traffic, among other things.

Figure 2:
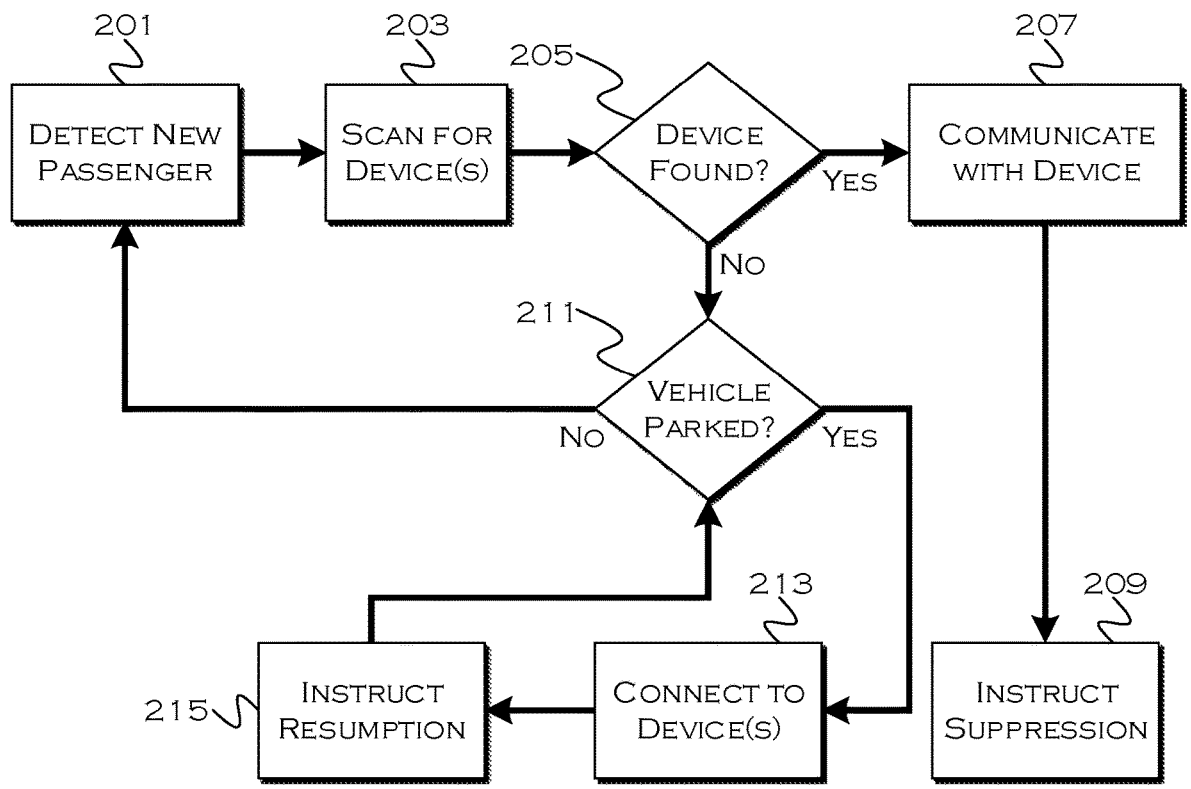
FIG. 2 shows an illustrative example of a process for device signal suppression.

FIG. 2 shows an illustrative example of a process for device signal suppression. In this illustrative example, the vehicle detects 201 when a passenger is present or when a new passenger is present. Depending on the efficacy and accuracy of passenger detection, the vehicle may be able to distinguish between passengers or the vehicle may simply determine whenever a door is opened and closed, for example, and use this action as a proxy for determining that passenger configuration has changed. In response to detecting a passenger, the vehicle may scan 203 for wireless devices, using a short range signal suitable for discretely determining passenger devices. Even if there is some overlap with external devices, a moving vehicle will soon cause only the devices in the vehicle to register for such a scan with any regularity (that is, proximate devices will vanish or change).

Another method of detecting devices is to determine that V2P communication has been received at the vehicle from a passenger device. The "fact" that the communication came from a passenger device can be quickly observed by, for example, device coordinates in the communication representing the same speed and locations as the vehicle.

Once the vehicle finds 205 a device, the vehicle can directly communicate 207 with the device to instruct 209 the device to cease V2P communication. In this example, the process may involve sending an instruction addressed to the device, or otherwise communicating directly and specifically with the device in question. As long as the vehicle remains in an unparked state 211, the process can continue to detect onboard devices and issue suppression instructions. If a single suppression instruction is all that is needed for a device, the vehicle can ignore previously suppressed devices until, for example, the vehicle is parked or the passenger configuration changes.

In this example, once the vehicle is parked 211, the process will connect 213 to each previously identified and suppressed device and issue 215 a resumption instruction. That will cause the device to again begin broadcasting V2P communication. In other examples, the devices may resume after a timeout period (during which no suppression signal was received) or responsive to device movement (off-road, for example) that would not correlate to the device being inside a vehicle.

If a vehicle can sense which devices have entered or exited the vehicle, targeted communications may be an option so that only a limited number of signals need to be sent (one to deactivate and possible one to reactive V2P). In other models, it may be more reasonable to have the vehicle broadcast a localized suppression request at periodic intervals, and rely on the devices to self-identify when the suppression request is not received during the interval, and thus the device can resume V2P communication.

For example, passengers A and B enter a vehicle and the vehicle begins moving. Using localized detection, the vehicle determines that two devices are inside a vehicle. Accordingly, the vehicle connects to device A and device B and instructs each device to suppress V2P communication. At some point in time, the vehicle stops to pick up person C and drop off person B. The vehicle recognizes that a door has opened and closed, and so the vehicle rescans for devices, now detecting a new device (belonging to C) and no longer detecting the device belonging to B. The vehicle responsively connects to C's device and instructs V2P suppression.

Since the vehicle was not parked, and since (in the example only), parking is the illustrative trigger for instructing resumption, the vehicle did not, in this example, have an opportunity to tell B's device to resume V2P broadcast. But, if B's device self-determines that it is, for example, out of range of the vehicle, moving in a pedestrian-like manner, moving in an off-road location, etc., B's device can self-determine that V2P communication should be resumed. Redundancies in triggering communication resumption can be built in to ensure that devices are not overly suppressed. For example, B's device may also resume communication if a certain time period passes in which B's device had not received a suppression instruction. In this latter instance, it may be the case that the type of suppression signal dictates which fall-back protocol the device uses. That is, if the device receives a periodic broadcast of a suppression signal, the device may enable resumption based on non-detection of the broadcast after a time period, but if the device receives a direct instruction, the device may rely on a different resumption protocol, since in the latter case the vehicle may only instruct suppression once for each device directly.

Figure 3:
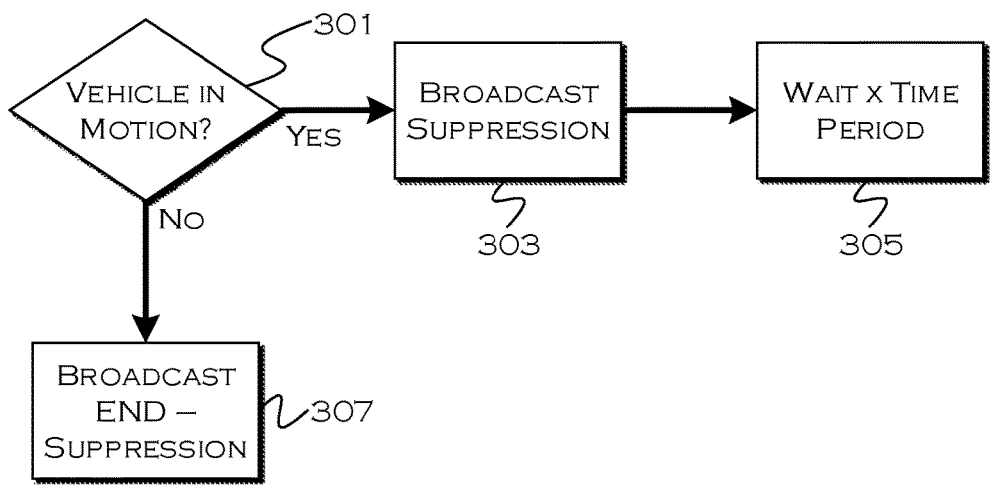
FIG. 3 shows a second illustrative process for device signal suppression.

FIG. 3 shows a second illustrative process for device signal suppression. In this example, the vehicle is broadcasting a localized suppression instruction once the vehicle is in motion 301. While the vehicle is in motion, the vehicle broadcasts 303 localized (short range) suppression instructions, which could be received by local devices on a regular basis. After each time period expires 305, the vehicle will re-determine a motion-state and re-broadcast the signal responsively. If the vehicle ever stops moving (or enters a parked state, depending on the criteria chosen), the vehicle may affirmatively broadcast an instruction to end suppression 307 or simply stop broadcasting a suppression signal.

It may be difficult to ensure that only onboard devices receive the broadcasts, but timeouts and other constraints can be used to mitigate the impact to external devices. For example, if a vehicle broadcasts a suppression signal every 15 seconds, and an external device receives the signal, it is likely the device will not again receive the signal 15 seconds later (since the vehicle will likely have moved out of range), and therefore the external device will only experience 15 seconds of downtime. In a similar manner, if a vehicle broadcasts a "resume transmission" instruction while the vehicle is parked, and a nearby moving vehicle passenger receives the instruction, that person's device may resume V2P communication, but likely only until the device receives the suppression signal from the vehicle in which the device is actually located.

In order to accommodate unexpected situations, such as accidents, devices may have fallback conditions to which the device defaults under certain conditions (e.g., rapid deceleration, non-receipt of signal, user override, etc.). This way, if a vehicle is unable to broadcast a "resumption" command, the device can still easily self-determine that resuming communication is advisable. In some models, a vehicle may broadcast an emergency "resume communication" message responsive to detecting or predicting an accident as well, but if the communication module is damaged before this message can be sent, the fallback procedures help keep the devices enabled to broadcast messages (if sometimes after a short delay).

Figure 4:
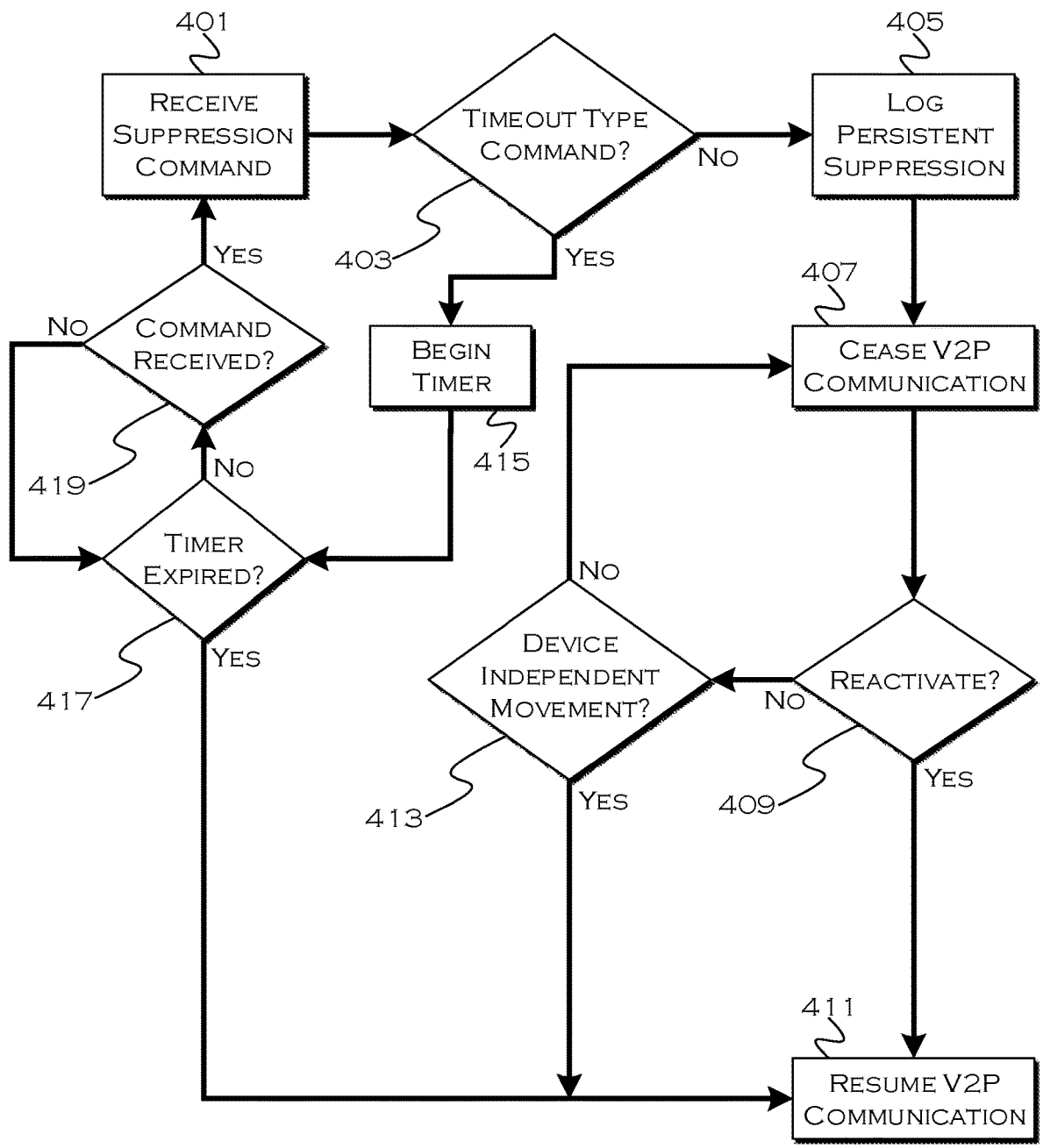
FIG. 4 shows an illustrative process for device signal reactivation.

FIG. 4 shows an illustrative process for device signal reactivation. This model is an example of a device that can receive a targeted or periodic suppression command, and which includes a fallback procedure based on device motion. Again, this is just an example of a device procedure, and other suppression and reactivation scenarios are also contemplated.

In this example, the process 401 receives a suppression instruction. The process determines 403 whether the suppression instruction included a timeout component or was otherwise not specifically targeted to the one device, or if the suppression command is directly targeted to the device and intended to suffice for the duration of a journey.

In the latter case, when the command is targeted to the device, the device can log 405 the command and a vehicle or command ID. This helps the device know when a reactivation command from the specific vehicle is issued, and may help prevent the device from being reactivated by an errant command from a nearby vehicle. The device also ceases V2P communication, responsive to the command, and waits 409 for a reactivation command.

While the device is waiting for a reactivation command, the device self-determines 413 if the device itself is moving in a manner uncharacteristic of a vehicle. Such movement would tend to indicate that the device is no longer within a vehicle, and further that the device may be out of range for a reactivation command. Accordingly, if such movement is detected, the device determines that it is no longer in a vehicle and resumes 411 V2P communication. If the device receives a resumption command prior to detecting the atypical (from a vehicle perspective) movement, the device also resumes V2P communication.

If the device initially received a command with a timeout component, or a command that was indicative of a periodic broadcast (e.g., not specifically targeted to a particular device), the device may begin 415 an internal timer. While the timer is not expired 417, the device suppresses 421 communication and waits 419 for the next suppression command. If the timer expires and the next command is not received, the device reactivates V2P communication, because the device treats this condition as though the device is either out of range of the next command (out of the vehicle) or the command transmitting module has been somehow damaged (accident) and so device transmission may be desired. While the determining factors for suppression/resumption are illustrative in nature, this example demonstrates how a single application on a device can be responsive to multiple paradigms for suppression.

For example, user A having a device executing the illustrative process of FIG. 4 enters a vehicle executing the illustrative process of FIG. 2. The vehicle detects A's device and directly issues a suppression command. A's device logs the command and a vehicle ID and responsively suppresses the V2P communication. At some point, A leaves the vehicle, but the vehicle only stopped, it did not park. As A walks into a building, A's device determines (based on A's location in the building) that A is no longer in a vehicle and reactivates A's V2P communication.

At a later point in time, A enters another vehicle, this vehicle executing the illustrative process of FIG. 3. At that point, the new vehicle broadcasts suppression as it begins to move, and A's device detects the broadcast, registers that the broadcast is a 1 minute interval broadcast, and suppresses V2P communication for 1 minute (plus a modest buffer, for example, 5 seconds). Every minute, the device receives another broadcast, and so the suppression continues. Once A exits the vehicle and moves out of broadcast range, when the next interval expires, the device no longer receives the suppression instruction, and therefore A's device can resume V2P communication.

Through use of the illustrative embodiments and the like, it is possible to achieve a measure of RF signal suppression over RF signals that are unnecessary in certain instances, without having to rely on humans to remember to disable and enable those signals selectively. The illustrative examples also can selectively limit which signals are sent or not sent, which may be a better option than a person disabling device transmission altogether.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a mobile device processor configured to:
communicate device information to vehicles, at least under predefined conditions;
receive an instruction, as a broadcast from a vehicle, to suppress communication of device information to vehicles;
responsive to the instruction, suppress communication of device information to vehicles until the mobile device processor determines that the mobile device is moving in a manner predefined as being uncharacteristic of vehicle movement, indicating that the device is likely no longer in a vehicle; and
responsive to the determination, resuming communication of device information to vehicles.

2. A system comprising:
a mobile device processor configured to:
communicate device information to vehicles, at least under predefined conditions;
receive an instruction, as direct communication from a vehicle to the mobile device, to suppress communication of device information to vehicles;
responsive to the instruction, suppress communication of device information to vehicles until the mobile device processor determines that the mobile device is moving in a manner predefined as being uncharacteristic of vehicle movement, indicating that the device is likely no longer in a vehicle; and
responsive to the determination, resuming communication of device information to vehicles.

3. A system comprising:
a mobile device processor configured to:

communicate device information to vehicles, at least under predefined conditions;
determine that the device is likely within the vehicle, based on a device characteristic change indicative of being within a vehicle
receive an instruction from a vehicle to suppress communication of device information to vehicles;
responsive to the instruction and the determination that the device is likely within the vehicle, suppress communication of device information to vehicles until the mobile device processor determines that the mobile device is moving in a manner predefined as being uncharacteristic of vehicle movement, indicating that the device is likely no longer in a vehicle; and
responsive to the determination, resuming communication of device information to vehicles.

* * * * *